(12) United States Patent
Nakajima

(10) Patent No.: US 6,373,431 B1
(45) Date of Patent: Apr. 16, 2002

(54) RECEIVER FOR RECEIVING RADIO WAVES FROM SATELLITES

(75) Inventor: Shuuji Nakajima, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/577,862

(22) Filed: May 24, 2000

(30) Foreign Application Priority Data

May 27, 1999 (JP) .......................................... 11-148019

(51) Int. Cl.[7] .............................. G01S 5/02; H04B 7/185

(52) U.S. Cl. ............................ 342/357.15; 342/357.16; 701/213

(58) Field of Search ....................... 342/357.15, 357.13, 342/357.06; 701/213

(56) References Cited

U.S. PATENT DOCUMENTS 6,052,646 A * 4/2000 Kirkhart et al. ............ 701/213

* cited by examiner

*Primary Examiner*—Theodore M. Blum
(74) *Attorney, Agent, or Firm*—Frishauf, Holtz, Goodman, Langer & Chick, P.C.

(57) ABSTRACT

In a position measuring receiver, when ephemeris data is acquired from radio waves received from satellites in the measurement of a present position of the receiver, the acquired ephemeris data and data on a time when the ephemeris data was acquired are stored (steps SA6–SA8). Then, a time elapsed since the ephemeris data was acquired is calculated at intervals of one minute (steps SA10–SA12). After the elapsed time is more than two hours, an alarm is sounded at intervals of two minutes (steps SA13–SA14) to urge a user to acquire new ephemeris data at a spot suitable for receiving radio waves from the satellites before an effective term of the old ephemeris data is expired.

9 Claims, 4 Drawing Sheets

RECEIVER FOR RECEIVING RADIO WAVES FROM SATELLITES

BACKGROUND OF THE INVENTION

1. Field of the Invention

The present invention relates to a position measuring apparatus for receiving waves from satellites of GPS (Global Positioning System) and for measuring the present position of the apparatus.

2. Background Art

Conventionally, a position measuring apparatus such as a car navigation apparatus which uses data received from GPS satellites knows substantially the exact positions of the respective GPS satellites based on satellite messages called ephemeris and almanac data carried by radio waves from the respective GPS satellites to reduce times required for catching the respective GPS satellites, or times required for synchronizing reception timings of the respective C/A (Coarse/Acquisition) codes from the satellites with transmission timings of those codes (satellite catch times) in order to achieve the position measurement in a short time.

The ephemeris data includes detailed data about an orbit of each sending satellite and correction to a clock time and is always updated, which can be achieved in about 30 seconds. The almanac data relates to the orbits of all the satellites and is effective for a long time unless the satellites malfunction, and takes about 12–13 minutes to acquire. Thus, the measuring apparatus stores in memory the ephemeris and almanac data acquired once. New ephemeris data is acquired. New ephemeris data is acquired by position measurement each time, for example, its effective term (of about 4 hours) has elapsed. Thus, as long as the ephemeris data is effective and the condition to receive radio waves is good, the position measurement is achieved generally in about 15 seconds.

However, if the ephemeris data is ineffective, the conventional position measuring apparatus is required to continue the position measurement for over 30 seconds even when the receiving condition is good in order to receive new ephemeris data. In a portable position measuring apparatus of especially a small type, its GPS antenna is small compared to that of the car navigation apparatus, and has a poor performance of receiving radio waves, which is likely to be influenced by its environment of use. Thus, when new ephemeris data is required to be acquired, a good receiving environment continuous for a predetermined time cannot often be secured, in which case thereafter the position measuring time will increase. Thus, with such a portable position measuring apparatus, the user who wishes to know his or her present position cannot often know it immediately, and the apparatus is not necessarily handy.

It is therefore an object of the present invention to provide a position measuring apparatus in which the position measurement is achieved steadily in a short time.

SUMMARY OF THE INVENITON

In order to achieve the above object, according to the present invention, there is provided a receiver for receiving radio waves from satellites, comprising:

measuring means for receiving radio waves from the satellites and for measuring a present position of the receiver;

a memory for storing ephemeris data acquired from the radio waves and used for measurement of the present position of the receiver by the measuring means;

determining means for determining a time elapsing since the ephemeris data was acquired;

reporting means for reporting to a user the necessity for acquisition of new ephemeris data; and control means, responsive to the elapsing time determined by the determining means exceeding a preset time, for causing the reporting means to report this fact to the user.

According to another aspect of the present invention receiver, there is also provided a receiver for receiving radio waves from a satellite, comprising:

calculating means for receiving the radio waves from the satellite and for calculating a present position of the receiver;

a memory for storing data on the satellite acquired from the radio waves and used for calculation of the present position of the receiver by the measuring means;

determining means for determining a time elapsing since the satellite data was acquired;

reporting means for reporting to a user the necessity for updating the satellite data; and control means, responsive to the elapsing time determined by the determining means exceeding a preset time, for causing the reporting means to report this fact to the user.

According to still another aspect of the present invention receiver, there is also provided a position measuring apparatus comprising:

calculating means for receiving radio waves from satellites and for calculating a present position of the apparatus;

a memory for storing ephemeris data obtained from the radio waves and used for calculating the present position of the apparatus, and a time when the ephemeris data was acquired;

registering means for registering a present time;

determining means for determining a time elapsing since the ephemeris data stored in the memory was acquired, based on the time when the ephemeris data was acquired and the present time registered by the registering means;

reporting means for reporting to the user the necessity for acquiring new ephemeris data; and control means, responsive to the elapsed time determined by the determining means exceeding a preset time, for causing the reporting means to report this fact to the user.

In these arrangements, when the time elapsing since data such as the ephemeris data was acquired from the satellites exceeds a preset time, the control means causes the reporting means to report to the user the necessity for acquisition of the satellite data. In response, if the user performs an operation to acquire the data, the acquired data is stored in the memory. Thus, by presetting a predetermined effective time not longer than the effective duration of the ephemeris data, occurrence of the situation where the satellite data is ineffective in the position measurement is avoided.

DESCRIPTION OF THE PREFERRED EMBODIMENTS

First Embodiment

Figure 1A:
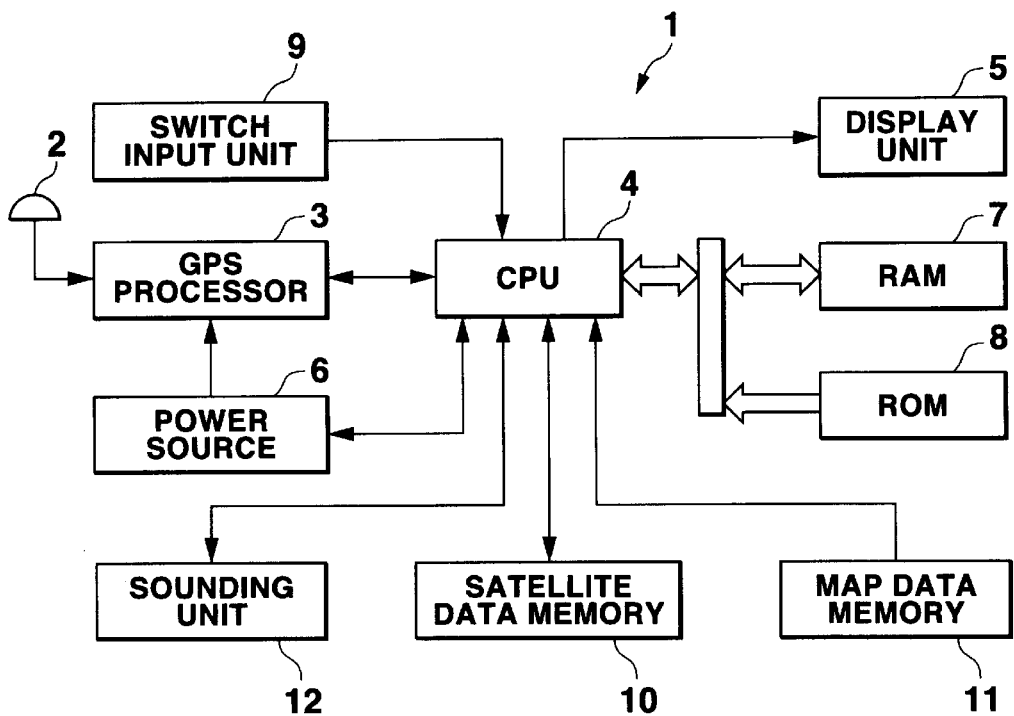
FIG. 1A is a block diagram of a position measuring apparatus included in common in respective embodiments of the present invention.
Figure 1B:
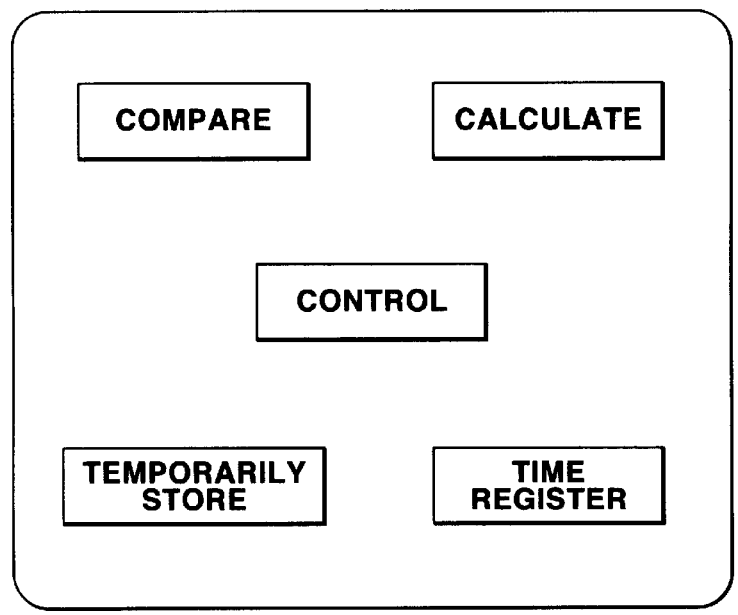
FIG. 1B is a block diagram of a CPU 4 of FIG. 1A.

Preferred embodiments of the present invention will be described with reference to the accompanying drawings. FIG. 1A is a block diagram of a position measuring apparatus according to the present invention. The position measuring apparatus 1 of FIGS. 1A and 1B is shared by all the embodiments of the present invention, and takes the form of a wristwatch wearable on a wrist of a user. Programs stored in the ROM (Read Only Memory) 8 of one embodiment are different from those stored in the ROM of another embodiment.

The position measuring apparatus 1 includes a GPS antenna 2 and a GPS processor 3, which includes a well-known arrangement (not shown) of an RF (Radio Frequency) signal processor, an A/D (Analog to Digital) converter, a data register, a counter, a decoder, a CPU (Central Processing Unit) for control of those elements, a ROM (Read Only Memory) and a RAM Random Access Memory). The GPS processor 3 amplifies and demodulates radio waves in an L1 band received by the GPS antenna 2 from the GPS satellites, decodes satellite data such as C/A codes, ephemeris and almanac data, and calculates, or measures, the position of the apparatus based on the decoded data. Data on a result of the measurement by the GPS processor 3 is then delivered to the CPU 4 which controls the whole measuring apparatus 1, and then displayed on a LCD (Liquid Crystal Display) (not shown) provided in a display unit 5. In a general clock mode, the LCD displays a present time based on time data delivered from a clock (not shown) to the CPU 4. In a GPS mode, the LCD displays the positions of the respective satellites and data on the receiving conditions. When the present position of the measuring apparatus is determined, the LCD displays the latitude and longitude of the present position of the apparatus measured by the GPS processor 3.

The GPS modes include three (general, continuous and intermittent) position measuring modes. In the general measuring mode, the apparatus starts to measure its present position in accordance with a user's starting operation, ends the measurement in accordance with the user's terminating operation, and even when no user's terminating operation is performed, terminates the measurement immediately in order to suppress power consumption when the ephemeris data is acquired after the position was determined. In the continuous measuring mode, the apparatus measures its position at intervals of a predetermined time and terminates the measurement in accordance with the user's terminating operation. In the intermittent measurement, only a synchronous counter (not shown) which synchronizes the apparatus with the respective satellite radio waves when the satellite waves are caught even at a non-measurement time is kept in operation to thereby start the position measurement immediately after the user starts the measuring operation. In the present embodiment, a navigation mode is also prepared in which a desired spot can be set or stored as a destination or an intermediary spot or which a distance between the present spot and the destination can be calculated.

The GPS processor 3 and the CPU 4 are supplied with power by a power source 6. The CPU 4 uses a RAM 7 as a working memory, and operates based on respective programs stored in the ROM 8 to control the respective elements of the GPS processor 3. The RAM 7 stores various data concerning control of the CPU 4 and data on destinations and other spots. The CPU 4 is connected to a switch input unit 9 which includes a plurality of switches (not shown) by which the user can select the respective clock and GPS modes, a satellite data memory 10, a map data memory 11, and a sounding unit 12. The satellite data memory 10 includes a nonvolatile memory (not shown) such as an EEPROM which stores ephemeris and almanac data read-lupdated by the GPS processor 3 and data on times at which these data were acquired. The map data memory 11 includes a ROM (not shown) which prestores unchangeable data such as map and position measurement data. The sounding unit 12 generates a plurality of reporting sounds based on instructions from the CPU 4 to fulfill various alarm functions of the apparatus 1.

FIG. 1B is a block diagram of the CPU 4 of FIG. 1A. As shown in FIG. 1B, the CPU 4 has at least functions of a control unit, an operating unit for performing various operations, a comparator which compares numerical values for times and others, a temporary memory for storing various data temporarily, and a time register which records an elapsed time.

Operation of the position measuring apparatus 1 will be described next with reference to a flowchart of FIG. 2 which shows the controlling process of the CPU 4 performed when the general measuring mode is set by the user. The CPU 4 monitors the start of a measuring operation. When the user starts the measuring operation (YES in step SA1), the CPU 4 determines whether ephemeris data stored in the satellite memory 10 is effective (step SA2). This determination is made depending on whether four hours have elapsed since the ephemeris data was acquired during which time the ephemeris data is generally usable or effective- If the determination indicates that the ephemeris data is ineffective, the GPS processor 3 starts to measure a present position of the apparatus (step SA4). In this process, when the GPS processor 3 catches a plurality of satellites, it receives C/A codes from them, determines the present position of the apparatus, and displays numerical data on the position on the display unit 5. Once the measuring process starts, it continues until new phemeris data is acquired unless the user performs a terminating operation (NO in both steps SA5 and SA6). When new ephemeris data is acquired during the operation (NO in steps SA6 and SA1, and YES in step SA9), the CPU 4 stores the acquired ephemeris in the satellite data memory 10, also stores in the RAM 7 data on the time when the data was acquired (step SA7), and then terminates the measuring process by the GPS processor 3 (step SA8). The measuring process is required to continue more than 30 seconds in order to acquire new ephemeris data. If the user performs the terminating operation during the measuring process (YES in step SA5), the CPU 4 immediately terminates this process even when the ephemeris data is being acquired, and interrupts supply of power to the GPS processor 3. The CPU 4 then returns its control to step SA1.

When the result of the determination in step SA2 is YES and the ephemeris data stored in the position measurement is effective, the CPU 4 reads this data from the satellite data memory 10 and causes the GPS processor 3 to start to measure the position of the apparatus based on the ephemeris data (step SA4), and then performs steps SA5–SA8. In this case, since the time required for acquiring the satellites is reduced, and if the condition to receive radio waves is good, the position measurement is achieved in about 15 seconds.

When the position measurement is at a stop (NO in step SA9), the CPU 4 performs a confirming and reporting process described next in order to urge the user to acquire ephemeris data as requested. First, the CPU 4 determines whether one minute has elapsed since the effectiveness of the ephemeris was confirmed last as data (step SA10). If otherwise, the CPU 4 immediately returns its control to step SA1. If one minute has elapsed, the CPU 4 reads from the RAM 7 data on the time when the ephemeris data was acquired (step SA11), and calculates an elapsed time between the present time and the time when the ephemeris data was acquired (step SA12), in order to confirm the effectiveness of the ephemeris as data. That is, the CPU 4 determines whether the elapsed time is more than two hours (step SA13). The two hours insures the effectiveness of the ephemeris data as data and accurate reflection of positions of many of the satellites by the ephemeris data stored at present. When the elapsed time is more than two hours and two minutes have elapsed since the last reporting time (YES in steps SA13 and SA14), the sounding unit 12 sounds an alarm (step SA15) and the CPU 4 returns its control to step SA1. If the result of the determination in any one of steps SA10, SA13 and SA14 is NO, the CPU 4 immediately returns its control to step SA1.

Figure 2:
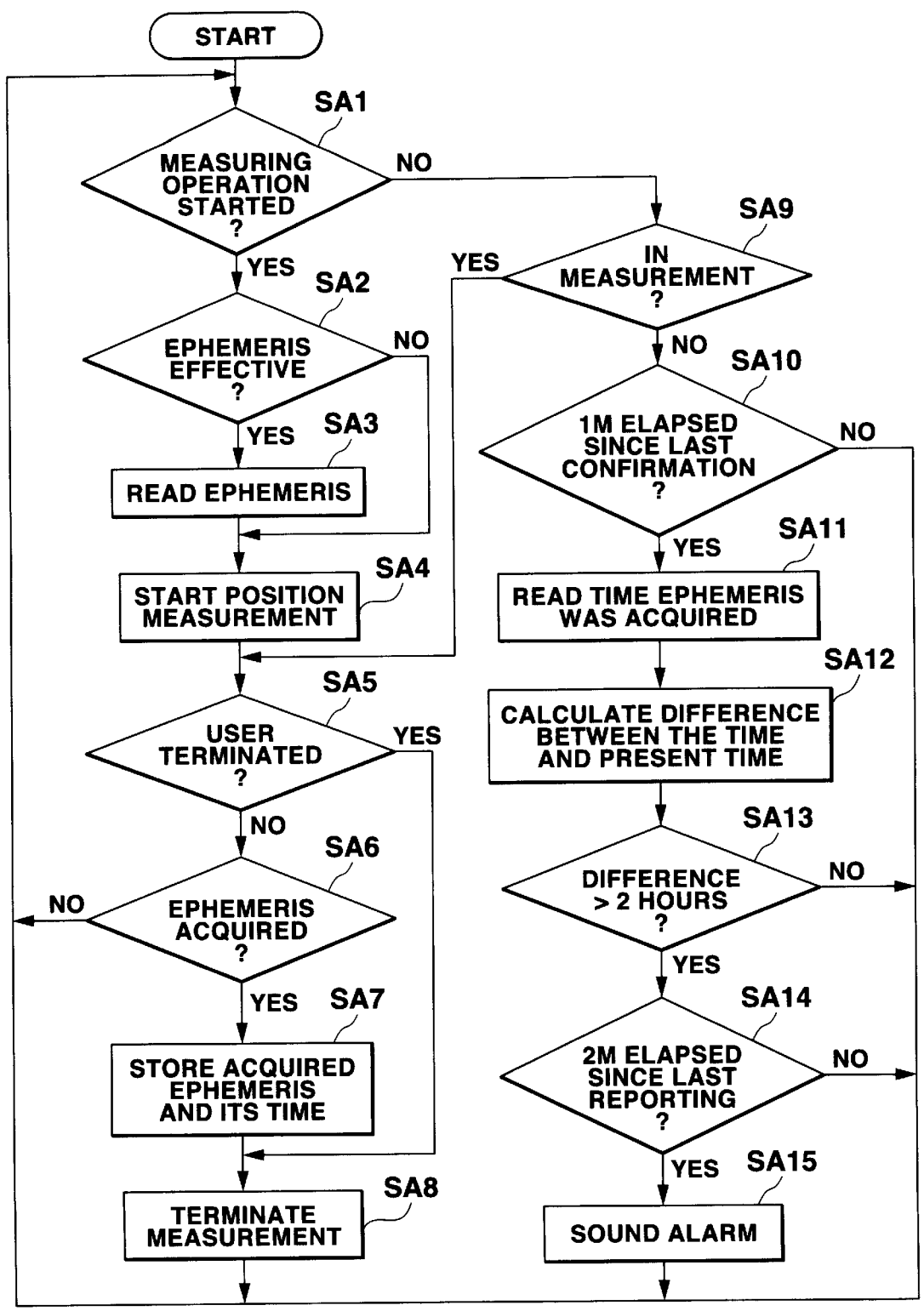
FIG. 2 is a flowchart of a control operation of the CPU 4 based on a program stored in a ROM 8 in a first embodiment of the present invention.

It is to be noted that each time the CPU 4 performs a respective one of the process in steps SA11–SA13 and the process in step SA15, the CPU 4 stores in the temporary store thereof a time when the respective process was performed such that those data can be used in the respective determining steps SA10 and SA14, which is not shown in FIG. 2. If there are no appropriate time data in the temporary store of the CPU 4 when the determining steps SA10 and SA14 are performed, or when each of the determining steps SA10 and SA14 is performed first, a result of the determination becomes YES.

In the confirming and reporting process of steps SA10–SA15, the CPU 4 confirms the effectiveness of the ephemeris data stored at present at intervals of one minute. When the CPU 4 determines that the effectiveness is lowered, it causes the sounding unit 12 to alert the user to it at intervals of two minutes. Thus, before the effective term of the ephemeris data ends, the user can measure the position of the apparatus continuously over 30 seconds in a spot good enough for receiving radio waves and acquire new ephemeris data. Then, when the user wishes to know the present position or performs a measurement other than the general measurement, the probability of informing the user of the present position immediately without taking a long time for measuring the present position increases. That is, the time for required to measure the position is steadily reduced. When the synchronous counter synchronized with transmission of satellite radio waves beforehand is in operation in the intermittent measurement mode, and a deviation of the counter form a reference is in an allowable range, the measurement is possible in several seconds.

In the embodiment, the confirming and reporting process in step SA10–SA15 is omitted and no alarm is sounded while the present position of the apparatus is being measured. Thus, the operation of the GPS processor 3 is not adversely affected by noise which would otherwise produced due to the sounding of an alarm by the sounding unit 12 and the present position is measured in a stabilized state to insure high accuracy of the measurement.

While in the embodiment new ephemeris data is illustrated as being acquired two hours after the last ephemeris data was acquired, the ephemeris data acquired is generally usable as data for less than four hours since the acquisition thereof. Thus, the user may be urged to acquire new ephemeris data, for example, three hours after the last ephemeris data was acquired. Instead of the alarm, another reporting means may be employed which provides light blinking or mechanical vibrations.

Second Embodiment

Figure 3:
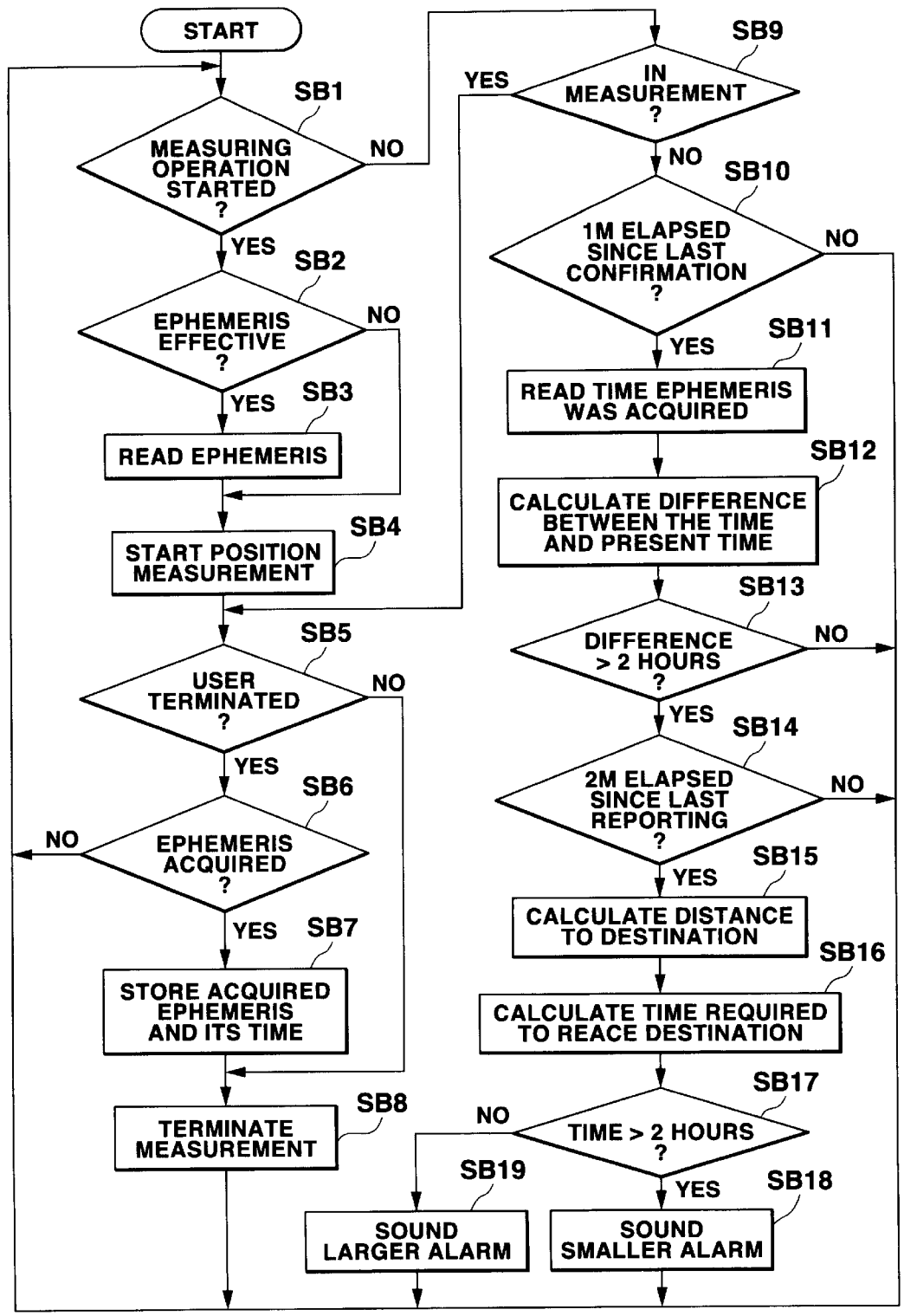
FIG. 3 is a flowchart of a control operation of the CPU 4 based on a program stored in the ROM 8 in a second embodiment of the present invention.

FIG. 3 is a flowchart of another controlling process performed by the CPU 4 as a second embodiment. In this process, steps SB1–SB14 are identical to the corresponding steps SA1–SB14 performed in the first embodiment. Then, in step SB15 the CPU 4 reads from the RAM 7 data on a spot set beforehand as a destination, and calculates a distance between the destination and the present position measured last. Then, the CPU 4 calculates a time required to move from the present position to the destination based the calculated distance and a preset standard walking speed (step SB16). Then, if the calculated required time is over 2 hours (NO in step SB17), the sounding unit 12 reports this fact to the user in a smaller alarm sound (step SB18) while if it is less than two hours, the sounding unit 12 reports this fact in a larger alarm sound (step SB 19). When no destination is set beforehand, the CPU 4 omits the processing in steps SB15–SB17, and returns its control immediately to step SB1 through step SB18.

In this confirming and reporting process, when the user comes nearer to the destination and the time required for moving from the user's present position to the destination is not more than two hours, the alarm which urges the user to acquire new ephemeris data changes from a smaller one to a larger one. Thus, when the importance of knowing the present position for the user increases and an increase in the number of times the user measures the present position is predicted, or the probability of the position measurement being performed increases, the user is strongly urged to update the ephemeris data to thereby insure updating the ephemeris data. Thus, according to the second embodiment, a reduction in the position measuring time in a state where the probability of the user performing the position measurement has increased is further insured compared to the first embodiment.

While in the present embodiment the user is strongly urged to update the ephemeris data by changing the volume of the alarm, the reporting type may be changed. For example, the user may be urged to update the ephemeris with the alarm before the time required to move from the user's present position to the destination is reduced to two hours, and then with mechanical vibrations or with both the alarm and the vibrations. Alternatively, such urging operation may be performed in two or more steps. Alternatively, the reporting style may be changed similarly before the time required for the user to move from his or her position to a set intermediary spot is reduced to two hours. While in the present embodiment the reporting type is illustrated as been changed as described above before the time required for the user to move to the destination is reduced to two hours, the reporting type may be changed only based on a distance from the user's present position to the destination.

While in the present embodiment the position measurement is illustrated as continuing after its start until new ephemeris data is acquired, even an arrangement which terminates the position measurement immediately when the present position is determined without acquiring another new piece of ephemeris data will produce advantageous effects similar to those produced by the first embodiment.

Third Embodiment

Figure 4:
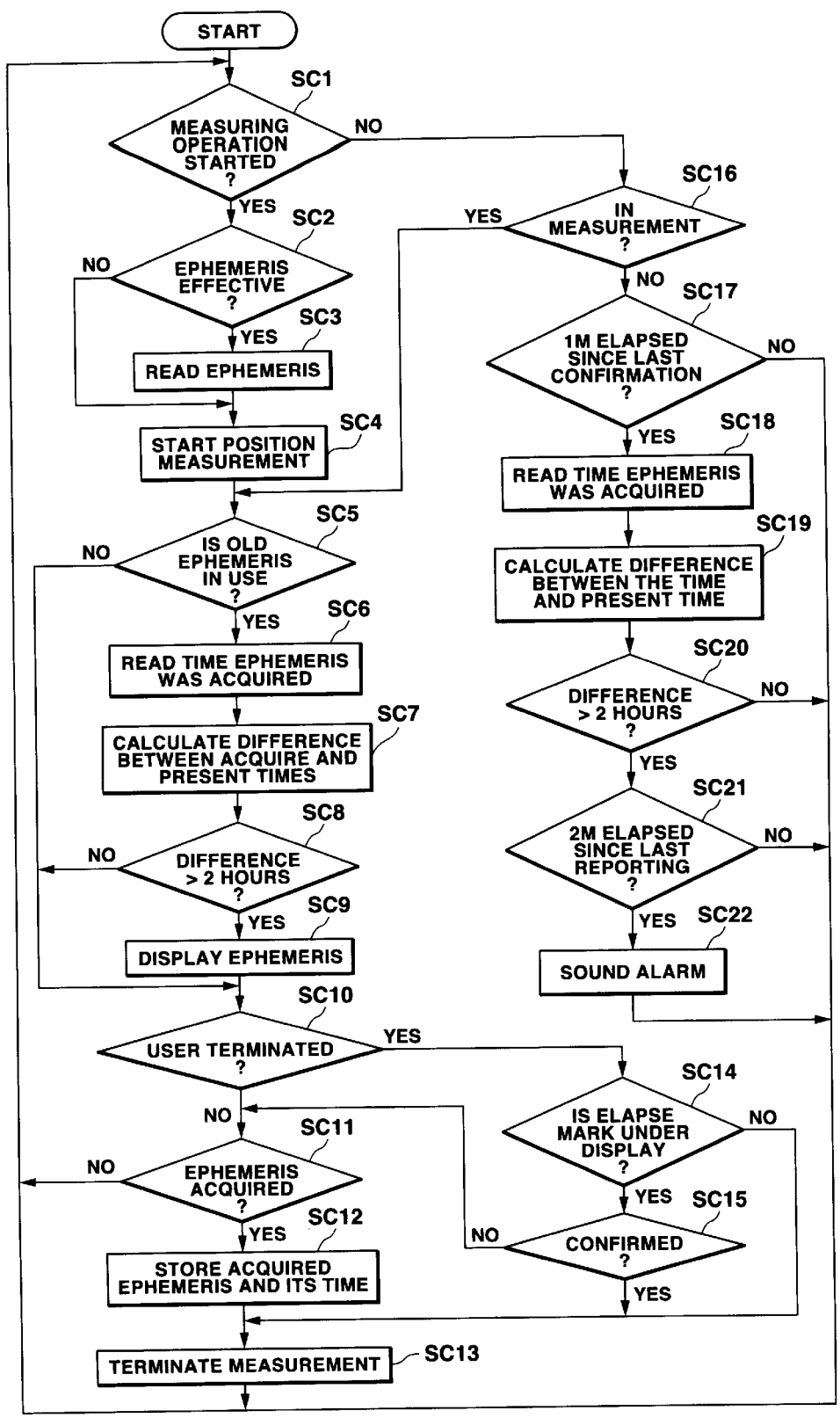
FIG. 4 is a flowchart of a control operation of the CPU 4 based on a program stored in the ROM 8 in a third embodiment of the present invention.

FIG. 4 is a flowchart of a further controlling process performed by the CPU 4 in a third embodiment. Also, in this embodiment the CPU 4 monitors whether the measurement starts (step SC1). If it starts (YES in step SC1), the CPU 4 determines whether the ephemeris data is effective (step SC2). If otherwise, the CPU 4 immediately starts the measurement by the GPS processor 3, as described in the first embodiment (step SC4). In this case, since a result of determination in next step SC5 becomes NO, the CPU 4 shifts its control to step SC10 where it continues the measuring process until new ephemeris data is acquired unless the user's terminating operation is performed as in the first and second embodiments (NO in steps SC10 and SC11). If new ephemeris data is acquired during this operation (YES in step SC11), the CPU 4 stores the ephemeris data in the satellite data memory 10, also stores in the RAM 7 data on the time when the ephemeris data was acquired (step SC12), and then terminates the position measuring process (step SC13). When the user terminates the measuring process during this process (YES in step SC10), the determination in step SC14 becomes NO, and the measurement immediately ends. When the position measuring process is at a stop, the CPU 4 performs the same confirming and reporting process as was performed in the first embodiment in steps SA10–SA15 (steps SC17–SC22).

When a result of the determination in step SC2 is YES and the ephemeris data is effective, the CPU 4 reads the stored ephemeris data (step SC3), delivers it to the GPS processor 3, and starts the measuring process (step SC4). Since this process uses the old ephemeris data (acquired in the past), the determination in step SC5 becomes YES. The CPU 4 then reads from the RAM 7 data on the time when the ephemeris data used was acquired (step SC6), and calculates a difference between the present time and the time when the last ephemeris data was acquired, or an time elapsed since the acquisition of the ephemeris data (step SC7). The CPU 4 then determines whether the elapsed time is more than two hours (step SC8). If otherwise, the CPU 4 immediately shifts its control to step SC10 to iterate steps SC10–SC13. When two hours elapses since the acquisition of the ephemeris data during such measuring process (performed for about 15 seconds in a good state of radio wave reception) (YES in step SC8), the CPU 4 displays a reacquire mark, which urges the user to reacquire new ephemeris data, on the LCD (not shown) of the display unit 5 (step SC9).

That is, when the time to acquire the ephemeris data has come during the position measuring process in a spot where the condition to receive radio waves is considered to be good, the user is immediately informed of it to urge the user to reacquire the ephemeris data, which requires position measurement continuing for more than 30 seconds. Thus, when the necessity for stopping the user or moving the user to a spot where the condition to receive radio waves is good, only for reacquisition of the ephemeris data, is greatly reduced. Thus, the time required for the position measurement is reduced steadily without increasing a load on the user greatly.

Even when the user performs a terminating operation after the reacquire mark is displayed in step SC9 (YES in step SC10), the CPU 4 shifts its control to step SC11 to continue the measuring process until new ephemeris data is acquired unless the user performs a predetermined confirming operation (YES in step SC14 and NO in step SC15). If the predetermined confirming operation is performed (YES in step SC15), the CPU 4 erases the reacquire mark and terminates the position measuring process (step SC13). That is, when the time to acquire ephemeris data during the position measurement has come, the user is required to perform the two operations to terminate the position measurement. Thus, the position measurement time is steadily reduced more reliably. While in the present embodiment the confirming and reporting process identical to that performed in the first embodiment is illustrated as being performed when the position measurement is at a stop, it may be replaced with the confirming and reporting process performed in the second embodiment.

Last, while in the respective embodiments the ephemeris data has been described as being stored in the satellite data memory and data on the time when the ephemeris data was acquired is illustrated as being stored in the RAM 7, both data may be stored in the same storage device, or the satellite data memory or RAM 7.

While the time is illustrated as being recorded in the CPU 4, time data may be used which is supplied from the clock (not shown). Time data included in the data received from the satellites may be used during the position measurement performed in the third embodiment.

What is claimed is:

1. A portable receiver for receiving radio waves from satellites, comprising:

measuring means for receiving radio waves from the satellites so as to measure a present position of the portable receiver;

a memory for storing ephemeris data acquired from the received radio waves and used for measurement of the present position of the portable receiver by said measuring means;

determining means for determining a time elapsed from when the ephemeris data was acquired;

reporting means for reporting to a user a necessity for acquiring new ephemeris data; and control means, responsive to the elapsed time determined by said determining means exceeding a preset time value, for causing said reporting means to report to the user; and an instruction unit adapted to enable the user to instruct acquisition of the new ephemeris data.

2. The receiver according to claim 1, wherein said control means causes said reporting means to report to the user at intervals of a predetermined time after the elapsed time has exceeded the preset time value.

3. The receiver according to claim 1, wherein said control means causes said reporting means to stop reporting to the user during the measurement of the present position of the portable receiver by said measuring means.

4. The receiver according to claim 1, further comprising a destination memory for storing a destination specified by the user, and wherein said control means changes a type of reporting by said reporting means after a distance between the present position of the portable receiver measured by said measuring means and the destination stored in said destination memory becomes not more than a predetermined distance.

5. The receiver according to claim 1, further comprising urging means for urging the user to acquire the new ephemeris data after the elapsed time determined by said determining means has exceeded the preset time value during the measurement of the present position of the portable receiver by said measuring means.

6. The receiver according to claim 1, wherein said measuring means comprises means for acquiring the ephemeris data, and wherein said control means comprises means, responsive to the elapsed time determined by said determining means exceeding the preset time value, for causing said measuring means to continue to measure the present position of the portable receiver until the user performs a predetermined operation for confirming that the elapsed time has exceeded the preset time value.

7. A receiver for receiving radio waves from satellites, comprising:

calculating means for receiving the radio waves from the satellites so as to calculate a present position of the receiver;

a memory for storing data on the satellites acquired from the radio waves and used for calculating the present position of the receiver by said measuring means;

determining means for determining a time elapsed from when the satellite data was acquired;

reporting means for reporting to a user a necessity for updating the satellite data;

control means, responsive to the elapsed time determined by said determining means exceeding a preset time value, for causing said reporting means to report to the user; and an instruction unit adapted to enable the user to instruct acquisition of updated satellite data.

8. A position measuring apparatus comprising:

calculating means for receiving radio waves from satellites and for calculating a present position of the apparatus;

a memory for storing ephemeris data obtained from the radio waves and used for calculating the present position of the apparatus, and a time at which the ephemeris data was acquired;

a timer for counting a present time;

determining means for determining a time elapsed from when the ephemeris data stored in the memory was acquired, based on the time at which the ephemeris data was acquired and the present time counted by said timer;

reporting means for reporting to a user a necessity for acquiring new ephemeris data;

control means, responsive to the elapsed time determined by said determining means exceeding a preset time value, for causing said reporting means to report to the user; and a switch unit adapted to enable the user to instruct reception of the new ephemeris data.

9. A satellite data receiving method comprising:

calculating a time elapsed from when ephemeris data stored in a memory was acquired;

determining whether or not said elapsed time exceeds a preset time value;

notifying a user when the elapsed time exceeds said preset time value; and acquiring new ephemeris data using a satellite data receiving unit when a user provides an instruction to receive said new ephemeris data.

* * * * *